United States Patent
Denning et al.

(10) Patent No.: US 12,296,689 B2
(45) Date of Patent: May 13, 2025

(54) CAUSING A BATTERY OF A MACHINE TO ENTER INTO A CHARGING STATE

(71) Applicant: Caterpillar Inc., Peoria, IL (US)

(72) Inventors: Dustin Dale Denning, Chillicothe, IL (US); Jason Lee Miller, Princeville, IL (US); Christopher L. Wynkoop, Eureka, IL (US); Srikar Thaduvayi, Oro Valley, AZ (US); Brett Michael Nee, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 225 days.

(21) Appl. No.: 18/054,826

(22) Filed: Nov. 11, 2022

(65) Prior Publication Data

US 2024/0157798 A1    May 16, 2024

(51) Int. Cl.
| | |
|---|---|
| *B60L 3/00* | (2019.01) |
| *F15B 15/20* | (2006.01) |
| *H02J 7/00* | (2006.01) |
| *B60L 1/00* | (2006.01) |

(52) U.S. Cl.
CPC ............ *B60L 3/0046* (2013.01); *B60L 3/003* (2013.01); *B60L 3/0061* (2013.01); *F15B 15/20* (2013.01); *H02J 7/007* (2013.01); *B60L 1/003* (2013.01)

(58) Field of Classification Search
None
See application file for complete search history.

(56) References Cited

U.S. PATENT DOCUMENTS

| | | | |
|---|---|---|---|
| 11,135,926 B2 | 10/2021 | Lee et al. | |
| 2002/0034682 A1 | 3/2002 | Moores, Jr. et al. | |
| 2004/0100225 A1* | 5/2004 | Neil | H02J 7/1446 |
| | | | 320/109 |
| 2013/0154360 A1 | 6/2013 | Ito | |
| 2014/0277869 A1* | 9/2014 | King | B60W 10/00 |
| | | | 701/22 |
| 2015/0032314 A1* | 1/2015 | Kitamura | B60W 20/10 |
| | | | 180/65.28 |

(Continued)

FOREIGN PATENT DOCUMENTS

| | | |
|---|---|---|
| CN | 104044479 B | 11/2017 |
| EP | 1199410 B1 | 1/2006 |

OTHER PUBLICATIONS

Written Opinion and International Search Report for Int'l. Patent Appln. No. PCT/US2023/076334, mailed Jan. 24, 2024 (15 pgs).

*Primary Examiner* — Jelani A Smith
*Assistant Examiner* — Davin Seol

(57) ABSTRACT

A controller of a machine identifies that a battery of the machine is connected to an electrical power connector component. The controller then causes one or more charging components of the battery of the machine to be enabled, then cause one or more electrical components associated with the battery of the machine to be enabled, then causes one or more cooling components of the machine to be enabled, then causes one or more propulsion components of the machine to be disabled, then causes one or more accumulator components of a hydraulic system of the machine to bleed, and then causes one or more non-accumulator components of the hydraulic system of the machine to be enabled. In this way, the controller causes the battery of the machine to enter into a charging state.

21 Claims, 7 Drawing Sheets

(56) References Cited

U.S. PATENT DOCUMENTS

| | | |
|---|---|---|
| 2015/0217659 A1 | 8/2015 | Seimiya |
| 2015/0367836 A1 | 12/2015 | Pruitt |
| 2016/0036260 A1* | 2/2016 | Nunez ............... H02J 7/007184 |
| | | 320/136 |
| 2018/0194243 A1* | 7/2018 | Cheng ...................... B60L 3/12 |
| 2019/0363406 A1 | 11/2019 | Yamada |
| 2019/0366859 A1* | 12/2019 | Winkler ................. B60L 58/10 |
| 2020/0164755 A1 | 5/2020 | Smolenaers |
| 2020/0182262 A1* | 6/2020 | Blackwell ............. F15B 21/005 |
| 2022/0001901 A1* | 1/2022 | Van Der Donk ........ B61D 3/20 |
| 2024/0083265 A1* | 3/2024 | Takaki .................... B60L 1/003 |

\* cited by examiner

CAUSING A BATTERY OF A MACHINE TO ENTER INTO A CHARGING STATE

TECHNICAL FIELD

The present disclosure relates generally to charging a battery of a machine and, for example, causing the battery of the machine to enter into a charging state.

BACKGROUND

Electric machines, such as vehicles or other mobile machines, that are at least partially powered by on-board batteries can be environmentally-friendly alternatives to machines powered by fossil fuels. However, in many cases, ensuring that a battery of an electric machine is properly charged is difficult. For example, when the battery is a high-voltage battery (e.g., that operates at greater than or equal to 750 volts (V)), charging the battery without providing a cooling functionality can cause the battery to overheat, which can cause damage to the battery and other components and systems of the electric machine. This can at least one affect a performance and an operable life of the battery and the machine. For example, the battery can fail or provide sub-optimal power, and the machine therefore may not be able to perform a work task, or may perform the task poorly, which further increases a risk of damage to the machine and the other components and the systems of the machine.

The controller of the present disclosure solves one or more of the problems set forth above and/or other problems in the art.

SUMMARY

In some implementations, a method includes identifying, by a controller of a machine, that a battery of the machine is connected to an electrical power connector component; determining, by the controller and based on identifying that the battery of the machine is connected to the electrical power connector component, that one or more initiation components of the machine are disabled; causing, by the controller and based on determining that the one or more initiation components of the machine are disabled, one or more charging components of the battery of the machine to be enabled; causing, by the controller and based on causing the one or more charging components of the battery of the machine to be enabled, one or more electrical components associated with the battery of the machine to be enabled; causing, by the controller and based on causing the one or more electrical components associated with the battery of the machine to be enabled, a shutdown timer associated with the battery of the machine to be disabled; causing, by the controller and based on causing the shutdown timer associated with the battery of the machine to be disabled, one or more cooling components of the machine to be enabled; causing, by the controller and based on causing the one or more cooling components of the machine to be enabled, one or more propulsion components of the machine to be disabled; causing, by the controller and based on causing the one or more propulsion components of the machine to be disabled, one or more accumulator components of a hydraulic system of the machine to bleed; causing, by the controller and based on causing the one or more accumulator components of the hydraulic system of the machine to bleed, one or more non-accumulator components of the hydraulic system of the machine to be enabled; and causing, by the controller, and based on causing the one or more non-accumulator components of the hydraulic system of the machine to be enabled, the battery of the machine to enter into a charging state.

In some implementations, a controller of a machine comprising: one or more memories; and one or more processors configured to: identify that a battery of the machine is connected to an electrical power connector component; cause, based on identifying that the battery of the machine is connected to the electrical power connector component, one or more charging components of the battery of the machine to be enabled; cause, based on causing the one or more charging components of the battery of the machine to be enabled, one or more electrical components associated with the battery of the machine to be enabled; cause, based on causing the one or more electrical components associated with the battery of the machine to be enabled, one or more cooling components of the machine to be enabled; cause, based on causing the one or more cooling components of the machine to be enabled, one or more propulsion components of the machine to be disabled; cause, based on causing the one or more propulsion components of the machine to be disabled, one or more non-accumulator components of the hydraulic system of the machine to be enabled.

In some implementations, a machine includes a battery; a cooling system; a hydraulic system; and a controller, wherein the controller is configured to: cause, based on identifying that the battery of the machine is connected to an electrical power connector component, one or more charging components of the battery of the machine to be enabled; cause, based on causing the one or more charging components of the battery of the machine to be enabled, one or more electrical components associated with the battery of the machine to be enabled; cause, based on causing the one or more electrical components associated with the battery of the machine to be enabled, one or more cooling components of the cooling system of the machine to be enabled; and cause, based on causing the one or more cooling components of the cooling system of the machine to be enabled, one or more adjustments to the hydraulic system of the machine.

DETAILED DESCRIPTION

This disclosure relates to a systems and methods for starting up and shutting down a machine, which is applicable to any machine that is at least partially powered by a battery. The machine any type of machine configured to perform operations associated with an industry such as mining, construction, farming, transportation, or any other industry.

Figure 1:
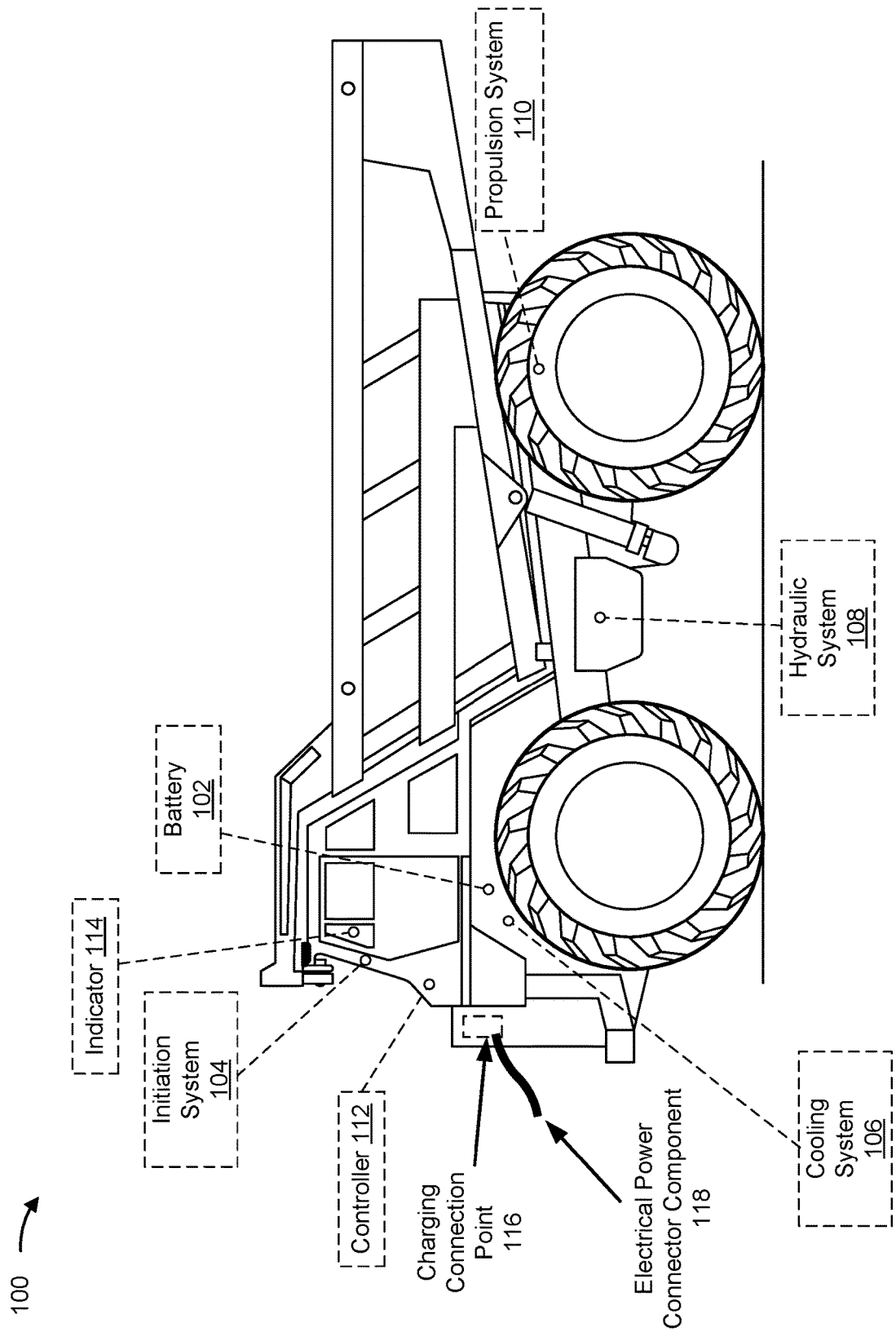
FIG. 1 is a diagram of an example machine described herein.

FIG. 1 is a diagram (e.g., a side-view) of an example machine 100 described herein. The machine 100 may be a mobile machine or vehicle, and may include a dump truck, a wheel loader, a hydraulic excavator, or another type of machine. Further, the machine 100 may be a manned machine or an unmanned machine. The machine 100 may be fully-autonomous, semi-autonomous, or remotely operated. As further shown in FIG. 1, the machine 100 may include a battery 102, an initiation system 104, a cooling system 106, a hydraulic system 108, a propulsion system 110, a controller 112, an indicator 114, and/or a charging connection point 116.

The machine 100 may be configured to be at least partially powered by the battery 102. For example, the machine 100 may be a battery electric machine (BEM), a battery electric vehicle (BEV), a hybrid vehicle, a fuel cell and battery hybrid vehicle, or another machine that is at least partially powered by the battery 102. The machine 100 may include one or more electric engines, one or more electric motors, one or more electrical conversion systems, and/or other electrical components that are configured to convert and/or use energy, such as energy stored in the battery 102, to cause overall movement of the machine 100 across a work site and/or to cause movement of individual components or systems of the machine 100.

The battery 102 may include one or more batteries, such as one or more lithium-ion (Li-ion) batteries, lithium-ion polymer batteries, nickel-metal hydride (NiMH) batteries, lead-acid batteries, nickel cadmium (Ni—Cd) batteries, zinc-air batteries, sodium-nickel chloride batteries, or other types of batteries. In some implementations, multiple battery cells may be grouped together, in series or in parallel, within a battery module. Multiple battery modules may be grouped together, such as in series, within a battery string. One or more battery strings may be provided within a battery pack, such as a group of battery strings linked together in parallel. Accordingly, the battery 102 may include one or more battery packs, one or more battery strings, one or more battery modules, and/or one or more battery cells.

The battery 102 may include one or more charging components (not shown in FIG. 1). For example, the battery 102 may include one or more switches, such as one or more key switches, that allow (or disallow) charging of the battery 102 (e.g., from an external power source). For example, the battery 102 may be active, such as to be charged, when the one or more charging components are enabled. In contrast, the battery 102 may be inactive, such as to prevent charging of the battery 102, when the one or more charging components are disabled. The one or more charging components may also be activation components that allow the battery 102 to provide power to other components and systems of the machine 100 when enabled, and that prevent the battery 102 from providing power to other components and systems of the machine 100 when not enabled.

The battery 102 may be associated with one or more electrical components (not shown in FIG. 1) of the machine 100, such as one or more electric power buses and/or one or more electric power converters, which may facilitate providing (or not providing) power to one or more other components or systems of the machine 100 from the battery 102. For example, the one or more electrical components may facilitate providing power to one or more other components or systems of the machine 100 when the one or more electrical components are enabled. In contrast, the one or more electrical components may not facilitate providing power to one or more other components or systems of the machine 100 when the one or more electrical components are disabled. In a specific example, the battery 102 may include an electric power bus (e.g., operating at 750 V), a first electric power converter (e.g., a DC to DC (DCDC) converter operating at 24 V), and a second electric power converter (e.g., a DCDC converter operating at 600 V).

The initiation system 104 may include one or more initiation components (not shown in FIG. 1) of the machine 100. The one or more initiation components may include, for example, a first initiation component (e.g., an engagement "ring," or other component), a second initiation component (e.g., a physical button, or other component), a third initiation component (e.g., a toggle switch, or other component), and/or another initiation component. An operator of the machine 100 may interact (e.g., manually interact) with the one or more initiation components to initiate a start-up (or a shut-down) of the machine 100 and/or components or systems of the machine 100. For example, the operator may interact with the one or more initiation components (e.g., turn an engagement ring, push a physical button, or engage a toggle switch) to cause the one or more initiation components to be enabled, and thereby initiate a start-up of the machine 100 and/or components or systems of the machine 100, as described herein. In contrast, the operator may interact with the one or more initiation components to cause the one or more initiation components to be disabled, and thereby initiate a shut-down (or other process) of the machine 100 and/or components or systems of the machine 100, as described herein.

The cooling system 106 may include one or more cooling components (not shown in FIG. 1) of the machine 100. The one or more cooling components may include, for example, one or more cooling bladders, one or more pumps, and/or one or more tanks for holding a coolant. The cooling system 106 may be configured to cool the battery 102 (e.g., when the battery 102 is active). For example, the one or more cooling components may facilitate cooling of the battery 102 when the one or more cooling components are enabled. In contrast, the one or more cooling components may not facilitate cooling of the battery when the one or more cooling components are disabled.

The hydraulic system 108 may include one or more accumulator components (not shown in FIG. 1) and/or one or more non-accumulator components. The one or more accumulator components may be configured to store hydraulic fluid under (or not under) pressure. For example, the one or more accumulator components may charge to increase a pressure of the hydraulic fluid (and thereby "energize" the one or more accumulator components), or, alternatively, may bleed to decrease the pressure of the hydraulic fluid (and thereby "deenergize" the one or more accumulator components). The one or more non-accumulator components may include one or more pumps, one or more motors (e.g., one or more switch reluctance motors), one or more valves, one or more cylinders, one or more pistons, and/or other non-accumulator components. The one or more non-accumulator components may enable charging and/or bleeding of the one or more accumulator components. For example, the one or more non-accumulator components may facilitate charging of the one or more accumulator components when the one or more non-accumulator components are enabled. In contrast, the one or more non-accumulator components may facilitate bleeding (or prevent additional charging) of the one or more accumulator components when the one or more non-accumulator components are disabled. In some implementations, the one or more accumulator components and/or the one or more non-accumulator components may be configured to facilitate performance of one or more hydraulic functions of the machine 100 (e.g., raising or lowering a bed of the machine 100, or another hydraulic function), such as when the one or more accumulator components are charged.

The propulsion system 110 may include one or more propulsion components of the machine 100. The one or more propulsion components may include, for example, a drive train (e.g., that includes a transmission), wheels, axles, or other components that are configured to facilitate propulsion of the machine 100 (e.g., movement of the machine 100 at a work site). For example, the one or more propulsion components may facilitate propulsion of the machine when the one or more propulsion components are enabled. In contrast, the one or more propulsion components may not facilitate propulsion (or may prevent propulsion) of the machine when the one or more propulsion components are disabled.

The controller 112 may be an electronic control module (ECM) or other computing device. The controller 112 may be in communication (e.g., by a wired connection or a wireless connection) with the battery 102, the initiation system 104, the cooling system 106, the hydraulic system 108, the propulsion system 110, the indicator 114, and/or the charging connection point 116. The controller 112 may also be in communication with other components and/or systems of the machine 100. The controller 112 may be configured to the control the battery 102, the initiation system 104, the cooling system 106, the hydraulic system 108, the propulsion system 110, and/or the indicator 114, as described herein (e.g., by generating and sending commands to the battery 102, the initiation system 104, the cooling system 106, the hydraulic system 108, the propulsion system 110, and/or the indicator 114).

The indicator 114 may include an aural component, a visual component, and/or haptic feedback component for providing information to the operator of the machine 100. For example, the indicator 114 may include a light-emitting component (e.g., that includes one or more light emitting diodes (LEDs)) that indicates information based on a color and/or emission pattern (e.g., flashing or steady-on) of light emitted by the light-emitting component.

The charging connection point 116 may be a wired or wireless energy transfer interface. For example, the charging connection point 116 may be an electrical plug, outlet, connector, charging port, or other wired electrical energy transfer interface that can be physically connected to an electrical power connector component 118 (e.g., that is configured to provide power to the battery 102 to charge the battery 102). As another example, the charging connection point 116 may be an inductive charging pad or other type of wireless energy transfer interface that can transfer energy wirelessly from the electrical power connector component 118. The charging connection point 116 may be located at a front of the machine 100. at a back of the machine 100, on a side of the machine 100, or at any other position on the machine 100.

The electrical power connector component 118 may include an energy transfer connector that is configured to attach to the charging connection point 116. The electrical power connector component 118 may be a wired or wireless energy transfer interface that is compatible with the charging connection point 116. For example, the electrical power connector component 118 may be an electrical plug, outlet, connector, charging port, or other wired electrical energy transfer interface that can be physically connected to the charging connection point 116. As another example, the electrical power connector component 118 may be an inductive charging pad or other type of wireless energy transfer interface that can transfer energy wirelessly to the charging connection point 116. Accordingly, when the electrical power connector component 118 is connected to the charging connection point 116, current can flow from a power source (e.g., that generates and/or provides electric power) through the electrical power connector component 118 to the charging connection point 116, which allows the electrical power connector component 118 to be connected (e.g., electrically connected) and to charge the battery 102, as described herein.

As indicated above, FIG. 1 is provided as an example. Other examples may differ from what is described in connection with FIG. 1.

FIGS. 2A-2D are diagrams of one or more example implementations 200 described herein.

Figure 2A:
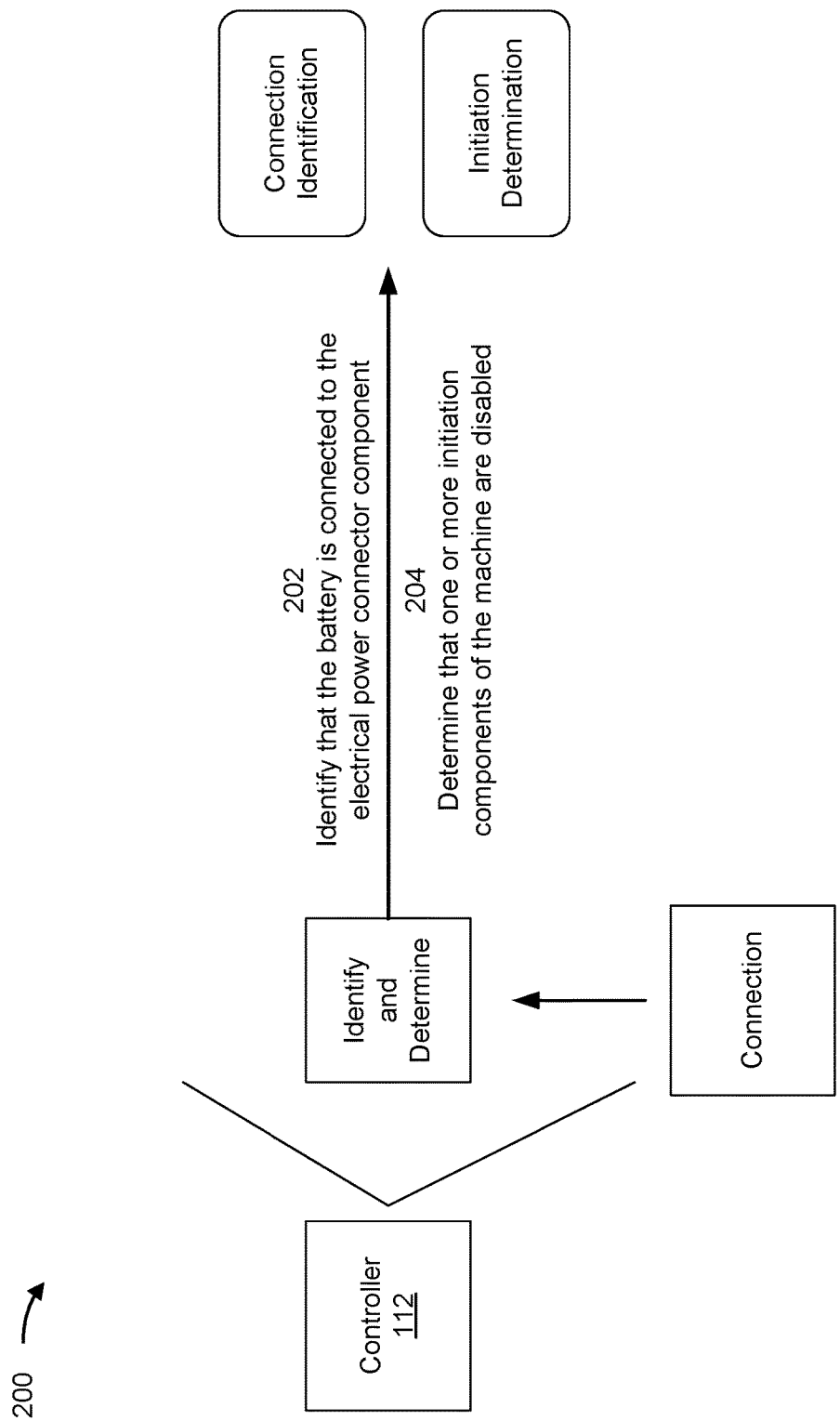
FIGS. 2A-2D are diagrams of one or more example implementations described herein.

As shown in FIG. 2A, and by reference number 202, the controller 112 may identify that the battery 102 is connected to the electrical power connector component 118 (e.g., via the charging connection point 116). For example, an operator of the machine 100 may physically connect the electrical power connector component 118 to the charging connection point 116, or the machine 100 may move (e.g., by utilizing the propulsion system 110) to cause the electrical power connector component 118 to physically connect to the charging connection point 116. This causes the battery 102 to be connected (e.g., electrically connected) to the electrical power connector component 118. The controller 112 may communicate with the charging connection point 116 and/or the battery 102 (and/or one or more sensors associated with the charging connection point 116 and/or the battery 102) to identify that the battery 102 is connected to the electrical power connector component 118 (also referred to herein as making a "connection identification").

In some implementations, the machine 100 may be in a "machine off" state when the controller 112 identifies that the battery 102 is connected to the electrical power connector component 118. That is, the machine 100 may not be active, such that the battery 102, the initiation system 104, the cooling system 106, the hydraulic system 108, the propulsion system 110, and/or the indicator 114 (and/or respective components thereof) are not enabled when the controller 112 identifies that the battery 102 is connected to the electrical power connector component 118. Alternatively, the machine 100 may be in a "waiting to charge" state when the controller 112 identifies that the battery 102 is connected to the electrical power connector component 118. That is, the machine 100 may be active, such that at least some of the battery 102, the initiation system 104, the cooling system 106, the hydraulic system 108, the propulsion system 110, and/or the indicator 114 (and/or respective components thereof) are enabled when the controller 112 identifies that the battery 102 is connected to the electrical power connector component 118.

As shown by reference number 204, the controller 112 may determine that the one or more initiation components (e.g., of the initiation system 104) are disabled (e.g., based on the connection identification). For example, an operator of the machine 100 may interact with the one or more initiation components (e.g., as described above) to cause the one or more initiation components to be disabled (e.g., in anticipation of charging the battery 102). The controller 112 may communicate with the initiation system 104 (and/or one or more sensors associated with the initiation system 104) to determine that the one or more initiation components are disabled (also referred to herein as making an "initiation determination").

In this way, the machine 100 may change from the machine off state or the waiting to charge state to an "able to charge" state (e.g., because the machine 100 is immobilized due to disablement of the one or more initiation components, which allows the battery 102 to be safely charged). Accordingly, the controller 112 may cause the indicator 114 to indicate the connection identification and/or initiation determination (e.g., by causing the indicator 114 to not emit any light).

Figure 2B:
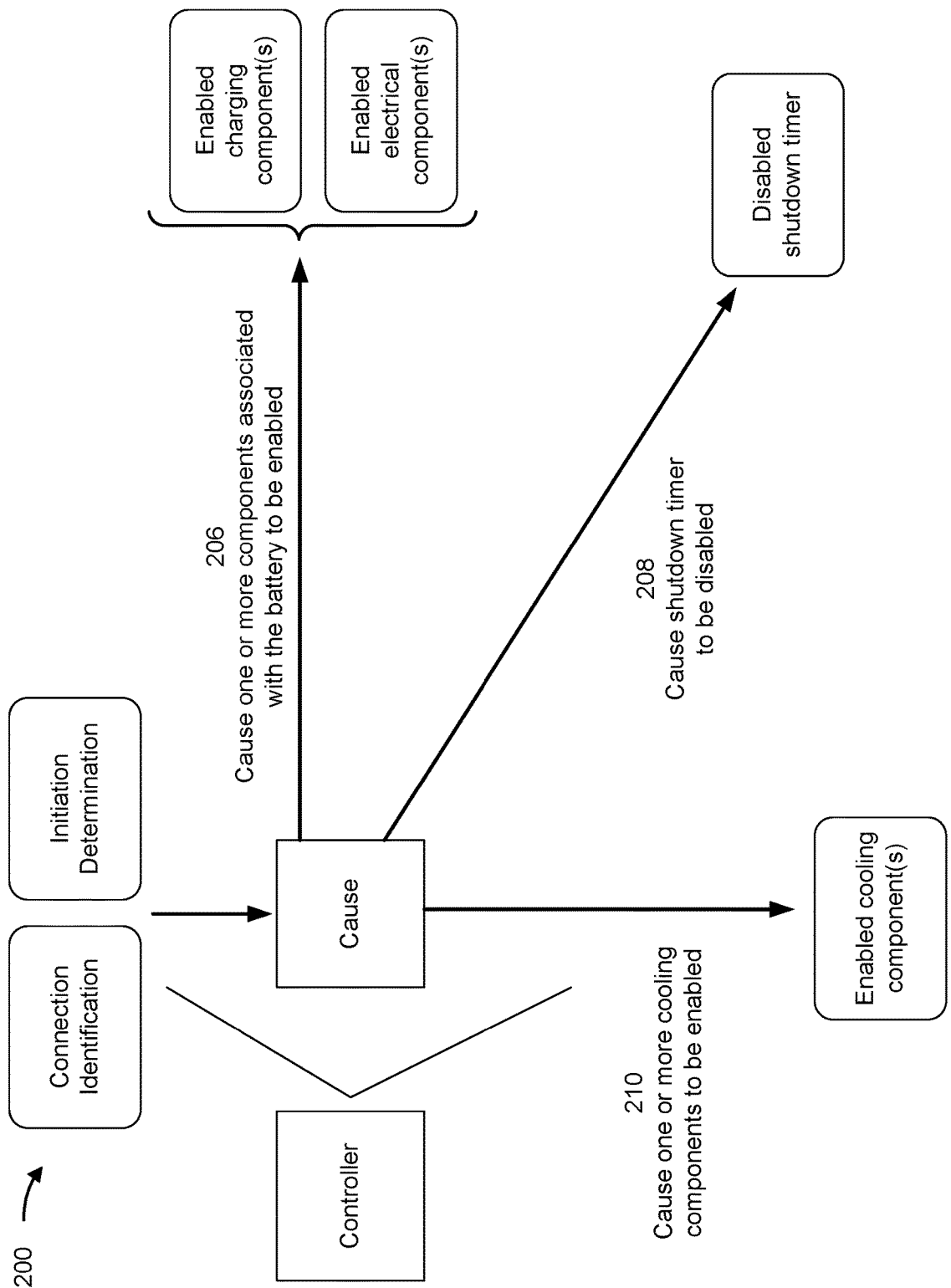

As shown in FIG. 2B, and by reference number 206, the controller 112 may cause one or more components associated with the battery 102 to be enabled (e.g., based on the connection identification and/or the initiation determination). For example, the controller 112 may cause the one or more charging components (e.g., of the battery 102) to be enabled, and/or the one or electrical components (e.g., associated with the battery 102) to be enabled. Causing the one or more charging components to be enabled may include causing one or more switches, such as one or more key switches, of the battery 102 to be enabled. Causing the one or more electrical components to be enabled may include causing one or more electric power buses and/or one or more electric power converters associated with the battery 102 to be enabled.

The controller 112 may cause the one or more components associated with the battery 102 to be enabled in a particular order (e.g., a battery enablement sequence). For example, the controller 112 may cause (e.g., based on the connection identification and/or the initiation determination) the one or more charging components (e.g., of the battery 102) to be enabled, and then may cause (e.g., based on causing the one or more charging components to be enabled) the one or electrical components (e.g., associated with the battery 102) to be enabled. In this way, the controller 112 causes the battery 102 to be active and then causes the battery 102 to provide power to other components and/or systems of the machine 100, including the cooling system 106 and the hydraulic system 108 (e.g., to permit the one or more cooling components of the cooling system 106 and/or the one or more non-accumulator components of the hydraulic system 108 to be enabled, as described herein). This reduces a likelihood that a sudden load is placed on the battery 102 upon activation, which thereby reduces a likelihood of damage to the battery 102.

In some implementations, such as when the machine 100 was in the waiting to charge state prior to changing to the able to charge state, a shutdown timer associated with the battery 102 may be enabled. When enabled, the shutdown timer may indicate an amount of time the battery is to remain active prior to be shutting down (e.g., after active operation of the machine 100). Accordingly, as shown by reference number 208, the controller 112 may cause the shutdown timer to be disabled (e.g., based on causing the one or more charging components of the battery 102 to be enabled and/or the one or more electrical components associated with the battery 102 to be enabled). In this way, the controller 112 prevents the battery 102 from being prematurely deactivated while being charged.

As shown by reference number 210, the controller 112 may cause one or more one or more cooling components (e.g., of the cooling system 106) to be enabled (e.g., based on causing the one or more charging components of the battery 102 to be enabled, causing the one or more electrical components associated with the battery 102 to be enabled, and/or causing the shutdown timer to be disabled). Causing the one or more cooling components to be enabled may include causing one or more cooling bladders, one or more pumps, and/or one or more tanks of the cooling system 106 to be enabled. In this way, the controller 112 causes the cooling system 106 to facilitate cooling the battery 102, which decreases a likelihood that the battery 102 will overheat and be damaged while charging. For example, causing the one or more cooling components (e.g., of the cooling system 106) to be enabled causes a cooling functionality to be provided for the battery 102.

Figure 2C:
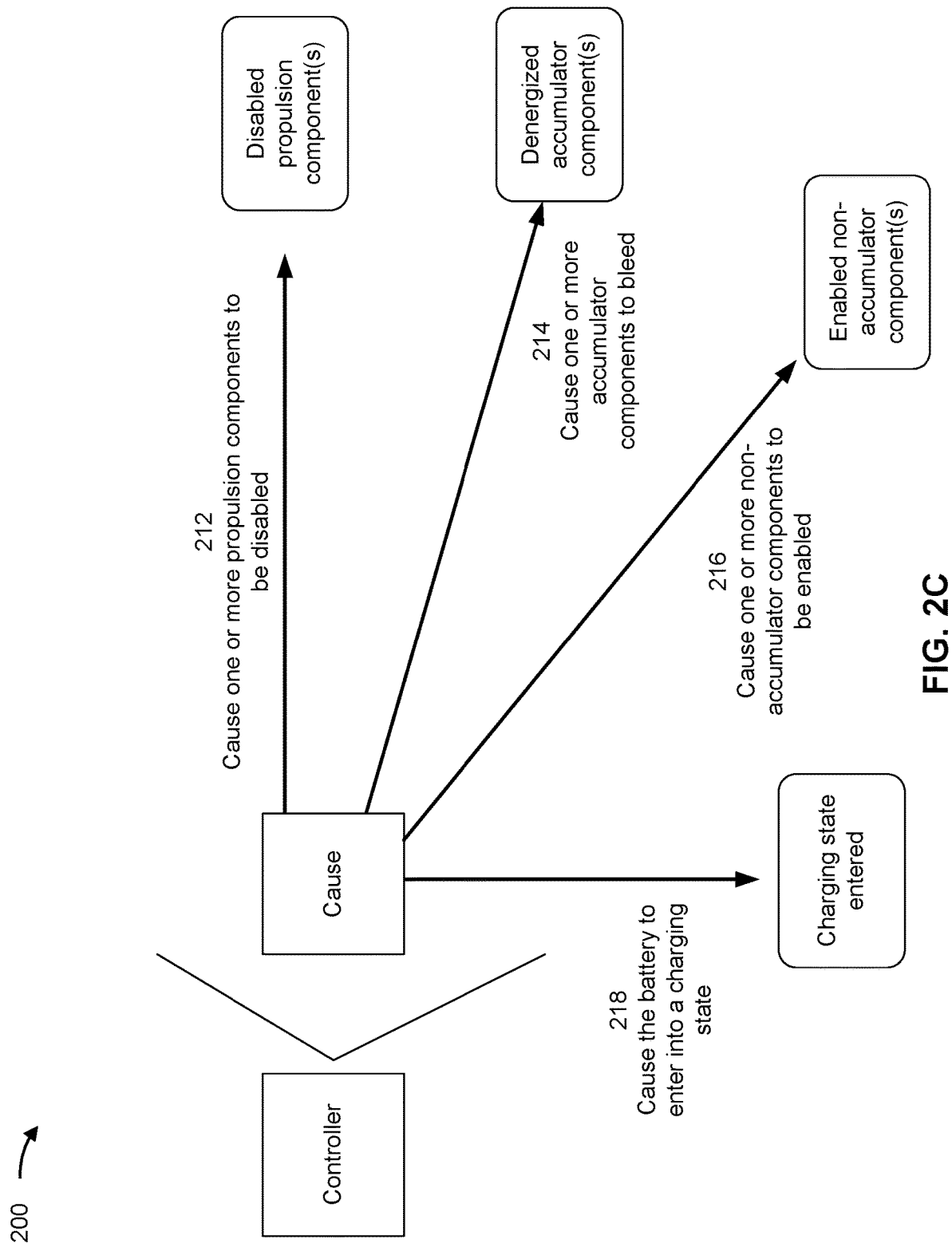

In some implementations, such as when the machine 100 was in the waiting to charge state prior to changing to the able to charge state, the one or more propulsion components (e.g., of the propulsion system 110) may be enabled (e.g., to allow the machine to move about the worksite). Accordingly, as shown in FIG. 2C, and by reference number 212, the controller 112 may cause the one or more propulsion components (e.g., of the propulsion system 110) to be disabled (e.g., based on causing the one or more cooling components to be enabled). Causing the one or more propulsion components to be disabled may include causing a drive train, wheels, and/or axles of the propulsion system 110 to be disabled. In this way, the controller 112 prevents propulsion of the machine 100, which reduces a likelihood that the one or more propulsion components, and/or other components and/or systems of the machine 100, are damaged while the battery 102 is charging.

In some implementations, such as when the machine 100 was in the waiting to charge state prior to changing to the able to charge state, the one or more accumulator components (e.g., of the hydraulic system 108) may be energized (e.g., to allow the machine 100 to perform one or more hydraulic functions). Accordingly, as shown by reference number 214, the controller 112 may cause the one or more accumulator components to bleed (e.g., based on causing the one or more cooling components to be enabled and/or causing the one or more propulsion components to be disabled). In this way, the controller 112 causes the one or more accumulator components to be deenergized, which reduces a likelihood that the one or more accumulator components and/or the one or more non-accumulator components of the hydraulic system 108, and/or other components and/or systems of the machine 100, are damaged while the battery 102 is charging.

In some implementations, such as when the machine 100 was in the machine off state prior to changing to the able to charge state, the one or more non-accumulator components (e.g., of the hydraulic system 108) may not be enabled. Accordingly, as shown by reference number 216, the controller 112 may cause the one or more non-accumulator components (e.g., of the hydraulic system 108) to be enabled (e.g., based on causing the one or more cooling components to be enabled, causing the one or more propulsion components to be disabled, and/or causing the one or more accumulator components to bleed). Causing the one or more non-accumulator components to be enabled may include causing one or more pumps, one or more motors, one or more valves, one or more cylinders, and/or one or more pistons of the hydraulic system 108 to be enabled. In this way, the controller 112 may further facilitate cooling the battery 102 (e.g., by causing a fan associated with the hydraulic system 108 to be active), which decreases a likelihood that the battery 102 will overheat and be damaged while charging. For example, causing the one or more cooling components (e.g., of the cooling system 106) to be enabled (e.g., as described herein in relation to FIG. 2B and reference number 210) and/or causing the one or more non-accumulator components to be enabled cause a cooling functionality to be provided for the battery 102.

In some implementations, causing the one or more accumulator components of the hydraulic system 108 to bleed and/or causing the one or more non-accumulator components of the hydraulic system 108 to be enabled may be referred to as causing one or more adjustments to the hydraulic system 108.

As shown by reference number 218, the controller 112 may cause the battery 102 to enter into a charging state (e.g., based on causing the one or more cooling components to be enabled, causing the one or more propulsion components to be disabled, causing the one or more accumulator components to bleed, and/or causing the one or more non-accumulator components to be enabled). That is, the controller 112 may cause (e.g., by communicating with the battery 102 and/or the charging connection point 116) the battery 102 to actively charge. Alternatively, the battery 102 may automatically enter into the charging state after the controller 112 causes the one or more charging components to be enabled, cause the one or more electrical components to be enabled, causes the shutdown timer to be disabled, causes the one or more cooling components to be enabled, causes the one or more propulsion components to be disabled, causes the one or more accumulator components to bleed, and/or causes the one or more non-accumulator components to be enabled.

Figure 2D:
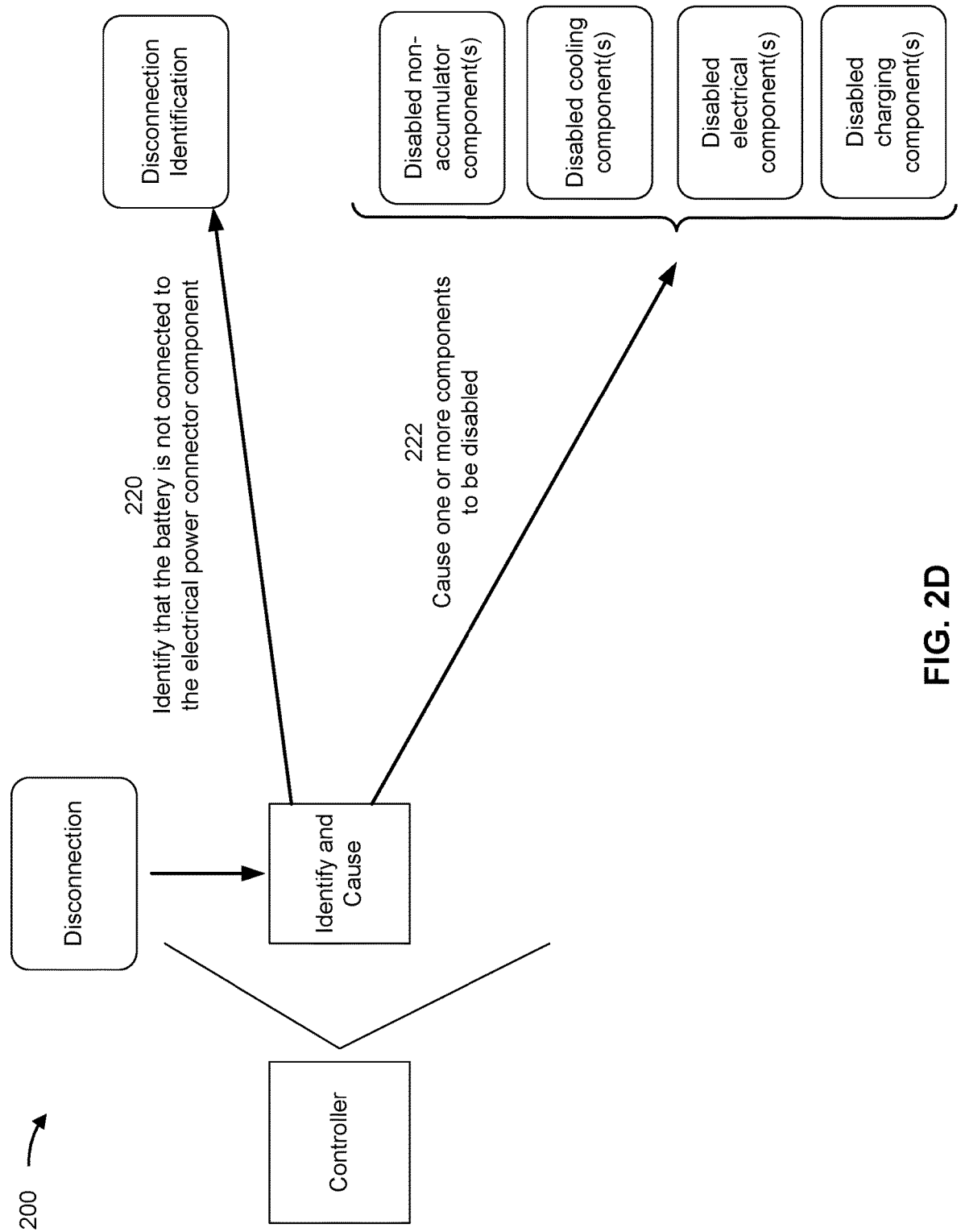

As shown in FIG. 2D, and by reference number 220, the controller 112 may identify that the battery 102 is not connected to the electrical power connector component 118 (e.g., via the charging connection point 116). For example, an operator of the machine 100 may physically disconnect the electrical power connector component 118 from the charging connection point 116. The controller 112 may communicate with the charging connection point 116 and/or the battery 102 (and/or one or more sensors associated with the charging connection point 116 and/or the battery 102) to identify that the battery 102 is not connected to the electrical power connector component 118 (also referred to herein as making a "disconnection identification"). The battery 102 not being connected to the electrical power connector component 118 causes the battery 102 to exit from the charging state and/or to enter into a non-charging state (e.g., the battery 102 ceases charging).

Accordingly, as shown by reference number 222, the controller 112 may cause one or more components to be disabled (e.g., based on the disconnection identification). For example, the controller 112 may cause the one or more non-accumulator components (e.g., of the hydraulic system 108) to be disabled, the one or more cooling components (e.g., of the cooling system 106) to be disabled, the one or electrical components (e.g., associated with the battery 102) to be disabled, and/or the one or more charging components (e.g., of the battery 102) to be disabled. Causing the one or more non-accumulator components to be disabled may include causing one or more pumps, one or more motors (e.g., switch reluctance motors), one or more valves, one or more cylinders, and/or one or more pistons of the hydraulic system 108 to be disabled. Causing the one or more cooling components to be disabled may include causing one or more cooling bladders, one or more pumps, and/or one or more tanks of the cooling system 106 to be disabled. Causing the one or more electrical components to be disabled may include causing one or more electric power buses to be disabled (e.g., that causes the one or more electric power buses to bleed) and/or one or more electric power converters associated with the battery 102 to be disabled. Causing the one or more charging components to be disabled may include causing may include causing one or more switches, such as one or more key switches, of the battery 102 to be disabled.

The controller 112 may cause the one or more components to be disabled in a particular order (e.g., a particular disablement sequence), which may be an opposite order of an order in which the one or more components were enabled (e.g., as described herein in relation to FIGS. 2B-2C). For example, the controller 112 may cause (e.g., based on the disconnection identification) the one or more non-accumulator components (e.g., of the hydraulic system 108) to be disabled, may cause (e.g., based on causing the one or more non-accumulator components to be disabled) the one or more cooling components (e.g., of the cooling system 106) to be disabled, may cause (e.g., based on causing the one or more cooling components to be disabled) the one or electrical components (e.g., associated with the battery 102) to be disabled, and/or may cause (e.g., based on causing the one or more electrical components to be disabled) the one or charging components (e.g., associated with the battery 102) to be disabled. In this way, the controller 112 causes the one or non-accumulator components of the hydraulic system 108 to be inactive, and then causes the one or more cooling components of the cooling system 106 to be inactive, which serially minimizes a load on the battery 102. This reduces a likelihood that the hydraulic system 108, the cooling system 106, and/or the battery 102 will be damaged, such as due to a sudden decrease in load on the battery 102. The controller 112 then causes the battery 102 to be inactive, which further decreases a likelihood of damage to the battery 102.

In this way, the machine 100 may change from the able to charge state to a "shutting down state" and/or the machine off state (e.g., as described herein in relation to FIG. 2A). Accordingly, the controller 112 may cause the indicator 114 to indicate that the one or more non-accumulator components, the one or more cooling components, the one or electrical components, and/or the one or more charging components are disabled (e.g., by causing the indicator 114 to emit no light).

In some implementations, while the machine 100 is in the able to charge state and the battery 102 is in the charge state (e.g., prior to disconnection of the battery 102 from the electrical power connector component 118), the controller 112 may determine that at least one initiation component, of the one or more initiation components of the initiation system 104, is enabled (also referred to herein as making an "enablement determination"). For example, the operator of the machine 100 may interact with the one or more initiation components to cause the at least one initiation component to be enabled (e.g., cause the engagement ring to be turned "on"). The controller 112 may determine that the at least one initiation component is enabled based on communicating with the initiation system 104. Accordingly, the controller 112 may cause one or more components to be disabled (e.g., based on the disconnection identification), as described herein in relation to reference number 222, and may thereby cause the battery 102 to exit from the charging state and/or to enter into a non-charging state (e.g., without disconnecting the electrical power connector component 118 from the battery 102). In this way, the machine 100 may change from the able to charge state to the shutting down state. This enables the operator of the machine 100 to later disconnect the battery 102 from the electrical power connector component 118 without causing the machine 100 to completely turn off (e.g., the machine 100 may remain in an "idle" state to facilitate a quicker start-up of the machine 100).

As indicated above, FIGS. 2A-2D are provided as an example. Other examples may differ from what is described in connection with FIGS. 2A-2D.

Figure 3:
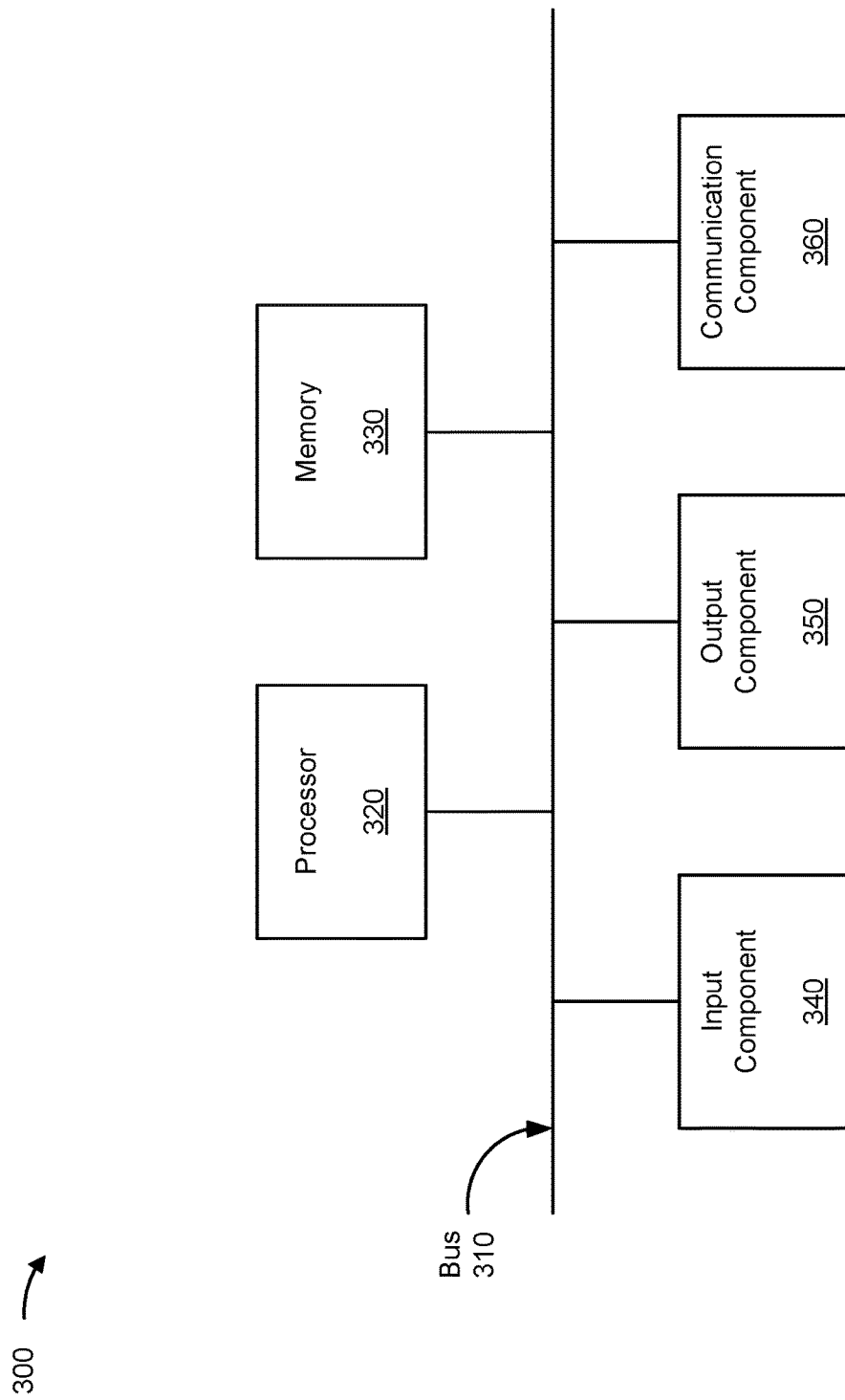
FIG. 3 is a diagram of example components of a device associated with causing a battery of a machine to enter into a charging state.

FIG. 3 is a diagram of example components of a device 300 associated with causing a battery of a machine to enter into a charging state. The device 300 may correspond to the controller 112 and/or one or more components of the battery 102, the initiation system 104, the cooling system 106, the hydraulic system 108, the propulsion system 110, and/or the indicator 114. The controller 112 and/or one or more components of the battery 102, the initiation system 104, the cooling system 106, the hydraulic system 108, the propulsion system 110, and/or the indicator 114 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. The processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. The memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. Execution of the set of instructions, by one or more processors 320, causes the one or more processors 320 and/or the device 300 to perform one or more operations or processes described herein. Hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
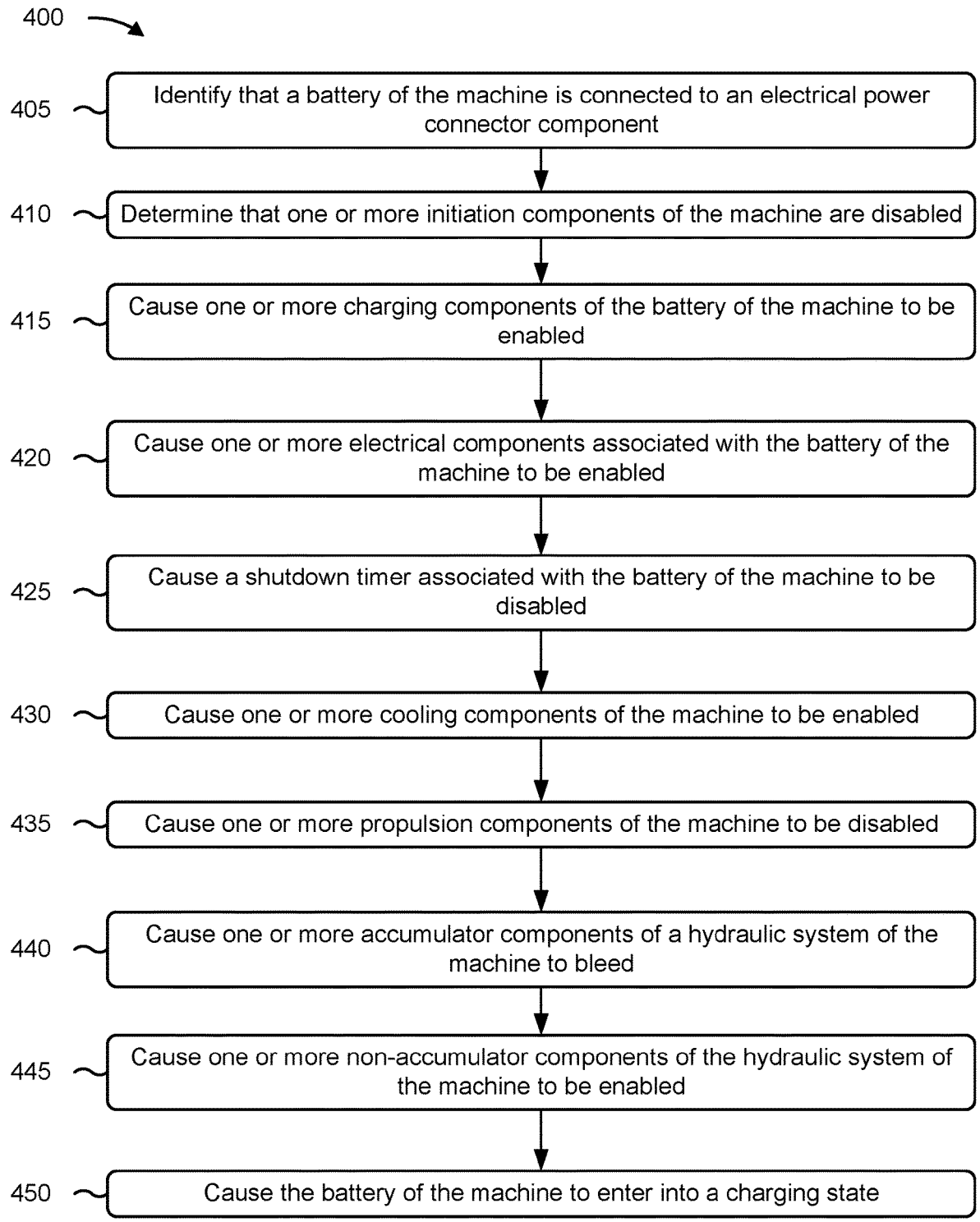
FIG. 4 is a flowchart of an example process associated with causing a battery of a machine to enter into a charging state.

FIG. 4 is a flowchart of an example process 400 associated with causing a battery of a machine to enter into a charging state. One or more process blocks of FIG. 4 may be performed by a controller (e.g., the controller 112). One or more process blocks of FIG. 4 may be performed by another device or a group of devices separate from or including the controller, such as one or more other components of the machine (e.g., one or more components of the battery 102, the initiation system 104, the cooling system 106, the hydraulic system 108, the propulsion system 110, and/or the indicator 114). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include identifying that a battery of the machine is connected to an electrical power connector component (block 405). For example, the controller may identify that a battery of the machine is connected to an electrical power connector component, as described above.

As further shown in FIG. 4, process 400 may include determining that one or more initiation components of the machine are disabled (block 410). For example, the controller may determine, based on identifying that the battery of the machine is connected to the electrical power connector component, that one or more initiation components of the machine are disabled, as described above.

As further shown in FIG. 4, process 400 may include causing one or more charging components of the battery of the machine to be enabled (block 415). For example, the controller may cause, based on determining that the one or more initiation components of the machine are disabled, one or more charging components of the battery of the machine to be enabled, as described above.

As further shown in FIG. 4, process 400 may include causing one or more electrical components associated with the battery of the machine to be enabled (block 420). For example, the controller may cause, based on causing the one or more charging components of the battery of the machine to be enabled, one or more electrical components associated with the battery of the machine to be enabled, as described above.

As further shown in FIG. 4, process 400 may include causing a shutdown timer associated with the battery of the machine to be disabled (block 425). For example, the controller may cause, based on causing the one or more electrical components associated with the battery of the machine to be enabled, a shutdown timer associated with the battery of the machine to be disabled, as described above.

As further shown in FIG. 4, process 400 may include causing one or more cooling components of the machine to be enabled (block 430). For example, the controller may cause, based on causing the shutdown timer associated with the battery of the machine to be disabled, one or more cooling components of the machine to be enabled, as described above.

As further shown in FIG. 4, process 400 may include causing one or more propulsion components of the machine to be disabled (block 435). For example, the controller may cause, based on causing the one or more cooling components of the machine to be enabled, one or more propulsion components of the machine to be disabled, as described above.

As further shown in FIG. 4, process 400 may include causing one or more accumulator components of a hydraulic system of the machine to bleed (block 440). For example, the controller may cause, based on causing the one or more propulsion components of the machine to be disabled, one or more accumulator components of a hydraulic system of the machine to bleed, as described above.

As further shown in FIG. 4, process 400 may include causing one or more non-accumulator components of the hydraulic system of the machine to be enabled (block 445). For example, the controller may cause, based on causing the one or more accumulator components of the hydraulic system of the machine to bleed, one or more non-accumulator components of the hydraulic system of the machine to be enabled, as described above.

As further shown in FIG. 4, process 400 may include causing the battery of the machine to enter into a charging state (block 450). For example, the controller may cause, based on causing the one or more non-accumulator components of the hydraulic system of the machine to be enabled, the battery of the machine to enter into a charging state, as described above.

Process 400 may include additional implementations, such as any single implementation or any combination of implementations described in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The disclosed controller (e.g., the controller 112) may be used in any machine that is at least partially powered by a battery to control charging of the battery. The controller automatically identifies that the battery is connected to an electrical power connector component. Accordingly, the controller causes the battery to be active and then causes the battery to provide power to other components and/or systems of the machine, including a cooling system and a hydraulic system. This reduces a likelihood that a sudden load is placed on the battery upon activation, which thereby reduces a likelihood of damage to the battery. The controller then causes the cooling system 106 to be active, which facilitates cooling the battery, and then causes the hydraulic system to be active, which further facilitates cooling the battery (e.g., by causing a fan associated with the hydraulic system to be active). This reduces a likelihood that the battery will overheat during charging of the battery. In this way, the controller causes the battery to enter into a charging state (e.g., that permits the battery to actively charge), while also reducing a likelihood that the battery will fail or be able to provide sub-optimal power. This reduces a likelihood of poor performance of the machine, and therefore reduces a likelihood of damage to the machine and the components and the systems of the machine due to a poor performance.

Further, the controller automatically identifies that the battery is no longer connected to the electrical power connector component, which causes the battery 102 to exit from the charging state and/or to enter into a non-charging state (e.g., the battery 102 ceases charging). The controller thereby causes the hydraulic system to be inactive, and then causes the one or more cooling components of the cooling system to be inactive, which serially minimizes a load on the battery. This reduces a likelihood that the hydraulic system, the cooling system, and/or the battery will be damaged, such as due to a sudden decrease in load on the battery. The controller then causes the battery to be inactive, which further decreases a likelihood of damage to the battery. This further reduces a likelihood of damage to the machine and the components and systems of the machine, thereby improving longevity and performance.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   identifying, by a controller of a machine, that a battery of the machine is connected to an electrical power connector component;
   determining, by the controller and based on identifying that the battery of the machine is connected to the electrical power connector component, that one or more initiation components of the machine are disabled;
   causing, by the controller and based on determining that the one or more initiation components of the machine are disabled, one or more charging components of the battery of the machine to be enabled;

causing, by the controller and based on causing the one or more charging components of the battery of the machine to be enabled, one or more electrical components associated with the battery of the machine to be enabled;

causing, by the controller and based on causing the one or more electrical components associated with the battery of the machine to be enabled, a shutdown timer associated with the battery of the machine to be disabled;

causing, by the controller and based on causing the shutdown timer associated with the battery of the machine to be disabled, one or more cooling components of the machine to be enabled;

causing, by the controller and based on causing the one or more cooling components of the machine to be enabled, one or more propulsion components of the machine to be disabled;

causing, by the controller and based on causing the one or more propulsion components of the machine to be disabled, one or more accumulator components of a hydraulic system of the machine to bleed;

causing, by the controller, and based on causing the one or more accumulator components of the hydraulic system of the machine to bleed, one or more non-accumulator components of the hydraulic system of the machine to be enabled; and causing, by the controller, and based on causing the one or more non-accumulator components of the hydraulic system of the machine to be enabled, the battery of the machine to enter into a charging state.

2. The method of claim 1, further comprising:
identifying that the battery of the machine is not connected to the electrical power connector component;
causing, based on identifying that the battery of the machine is not connected to the electrical power connector component, the one or more non-accumulator components of the hydraulic system of the machine to be disabled;
causing, based on causing the one or more non-accumulator components of the hydraulic system of the machine to be disabled, the one or more cooling components of the machine to be disabled; and
causing, based on causing the one or more cooling components of the machine to be disabled, the one or more electrical components associated with the battery of the machine to be disabled.

3. The method of claim 2, wherein the battery of the machine not being connected to the electrical power connector component causes the battery of the machine to exit from the charging state.

4. The method of claim 2, further comprising:
causing, based on causing the one or more electrical components associated with the battery of the machine to be disabled, the one or more charging components of the battery of the machine to be disabled.

5. The method of claim 2, wherein the one or more electrical components associated with the battery of the machine include one or more electric power converters and one or more electric power buses,
wherein causing the one or more electrical components associated with the battery of the machine to be disabled comprises:
causing the one or more electric power converters and the one or more electric power buses to be disabled; and
causing the one or more electric power buses to bleed.

6. The method of claim 1, wherein causing the one or more cooling components of the machine to be enabled and causing the one or more non-accumulator components of the hydraulic system of the machine to be enabled cause a cooling functionality to be provided for the battery of the machine.

7. A controller of a machine, comprising:
one or more memories; and
one or more processors configured to:
identify that a battery of the machine is connected to an electrical power connector component;
cause, based on identifying that the battery of the machine is connected to the electrical power connector component, one or more charging components of the battery of the machine to be enabled;
cause, based on causing the one or more charging components of the battery of the machine to be enabled, one or more electrical components associated with the battery of the machine to be enabled;
cause, based on causing the one or more electrical components associated with the battery of the machine to be enabled, one or more cooling components of the machine to be enabled;
cause, based on causing the one or more cooling components of the machine to be enabled, one or more propulsion components of the machine to be disabled;
cause, based on causing the one or more propulsion components of the machine to be disabled, one or more non-accumulator components of a hydraulic system of the machine to be enabled;
identify that the battery of the machine is not connected to the electrical power connector component;
cause, based on identifying that the battery of the machine is not connected to the electrical power connector component, the one or more non-accumulator components of the hydraulic system of the machine to be disabled;
cause, based on causing the one or more non-accumulator components of the hydraulic system of the machine to be disabled, the one or more cooling components of the machine to be disabled; and
cause, based on causing the one or more cooling components of the machine to be disabled, the one or more electrical components associated with the battery of the machine to be disabled.

8. The controller of claim 7, wherein the one or more processors, to cause the one or more electrical components associated with the battery of the machine to be enabled, are configured to:
cause a shutdown timer associated with the battery of the machine to be disabled; and
cause at least one of:
one or more electric power buses associated with the battery of the machine to be enabled, or
one or more electric power converters associated with the battery of the machine to be disabled.

9. The controller of claim 7, wherein the one or more processors, to cause the one or more propulsion components of the machine to be disabled, are configured to:
cause one or more components of a drive train of the machine to be disabled.

10. The controller of claim 7, wherein causing the one or more cooling components of the machine to be enabled and causing the one or more non-accumulator components of the hydraulic system of the machine to be enabled cause a cooling functionality to be provided for the battery of the machine.

11. The controller of claim 7, wherein causing the one or more non-accumulator components of the hydraulic system of the machine to be enabled is to permit the battery of the machine to enter into a charging state.

12. The controller of claim 7, wherein the battery of the machine not being connected to the electrical power connector component causes the battery of the machine to enter into a non-charging state.

13. The controller of claim 7, wherein the one or more processors are further configured to:
    cause, based on causing the one or more electrical components associated with the battery of the machine to be disabled, the one or more charging components of the battery of the machine to be disabled.

14. A machine, comprising:
    a battery;
    a cooling system;
    a hydraulic system; and
    a controller, wherein the controller is configured to:
        cause, based on identifying that the battery of the machine is connected to an electrical power connector component, one or more charging components of the battery of the machine to be enabled;
        cause, based on causing the one or more charging components of the battery of the machine to be enabled, one or more electrical components associated with the battery of the machine to be enabled;
        cause, based on causing the one or more electrical components associated with the battery of the machine to be enabled, one or more cooling components of the cooling system of the machine to be enabled;
        cause, based on causing the one or more cooling components of the cooling system of the machine to be enabled, one or more adjustments to the hydraulic system of the machine;
        cause, based on identifying that the battery of the machine is not connected to the electrical power connector component, one or more other adjustments to the hydraulic system of the machine;
        cause, based on causing the one or more other adjustments to the hydraulic system of the machine, the one or more cooling components of the cooling system of the machine to be disabled;
        cause, based on causing the one or more cooling components of the cooling system of the machine to be disabled, the one or more electrical components associated with the battery of the machine to be disabled; and
        cause, based on causing the one or more electrical components associated with the battery of the machine to be disabled, the one or more charging components of the battery of the machine to be disabled.

15. The machine of claim 14, further comprising a propulsion system, wherein the controller is further configured to:
    cause, based on causing the one or more electrical components associated with the battery of the machine to be enabled, one or more propulsion components of the propulsion system of the machine to be disabled.

16. The machine of claim 14, wherein the controller, to cause the one or more adjustments to the hydraulic system of the machine, is configured to at least one of:
    cause one or more accumulator components of the hydraulic system of the machine to bleed; or
    cause one or more non-accumulator components of the hydraulic system of the machine to be enabled.

17. The machine of claim 14, wherein causing the one or more adjustments to the hydraulic system of the machine is to permit the battery of the machine to enter into a charging state.

18. The machine of claim 14, wherein the battery of the machine not being connected to the electrical power connector component causes the battery of the machine to enter into a non-charging state.

19. The controller of claim 7, wherein, when the battery of the machine is identified as connected to the electrical power connector component, the machine is active.

20. The machine of claim 14, wherein, when the one or more charging components of the battery of the machine is caused to be enabled, the machine is inactive.

21. The controller of claim 7, wherein the one or more processors are further configured to:
    cause, based on causing the one or more non-accumulator components of a hydraulic system of the machine to be enabled, the battery of the machine to enter into a charging state,
    wherein the one or more processors, to identify that the battery of the machine is not connected to the electrical power connector component, are configured to:
        identify, after causing the battery of the machine to enter into the charging state, that the battery of the machine is not connected to the electrical power connector component.

* * * * *